US012786538B2

(12) United States Patent
Ueguri et al.

(10) Patent No.: US 12,786,538 B2
(45) Date of Patent: Nov. 3, 2026

(54) IMAGE CAPTURING APPARATUS HAVING DISPLAY DEVICE, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventors: Toshiaki Ueguri, Tokyo (JP); Daiyu Ueno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 141 days.

(21) Appl. No.: 18/825,172

(22) Filed: Sep. 5, 2024

(65) Prior Publication Data

US 2025/0126337 A1 Apr. 17, 2025

(30) Foreign Application Priority Data

Oct. 17, 2023 (JP) ................................ 2023-178720

(51) Int. Cl.
*H04N 23/53* (2023.01)
*H04N 23/63* (2023.01)

(52) U.S. Cl.
CPC ......... *H04N 23/531* (2023.01); *H04N 23/631* (2023.01)

(58) Field of Classification Search
CPC .......................... H04N 23/531; H04N 23/631
USPC .................................................... 348/333.06
See application file for complete search history.

(56) References Cited

U.S. PATENT DOCUMENTS

2011/0109784 A1 5/2011 Akiyama
2018/0220076 A1* 8/2018 Kamiya ................ H04N 23/60

FOREIGN PATENT DOCUMENTS

JP 2011103551 A 5/2011
JP 2021136653 A 9/2021

OTHER PUBLICATIONS

World of Tech, Sep. 23, 2021, GoPro Hero 10: How to Change Screen Orientation (Stuck Upside Down or Side Ways?), https://www.youtube.com/watch?v=Z6FP-IoNDBO.*

* cited by examiner

*Primary Examiner* — Joel W Fosselman
(74) *Attorney, Agent, or Firm* — Cowan, Liebowitz & Latman, P.C.

(57) ABSTRACT

An image capturing apparatus capable of displaying an image on a movable display device more appropriately. The display device is attached to an apparatus body movably between a position where a display surface is directed to an object side and a position where the display surface is directed in an opposite direction. A processor executes instructions stored in a memory to set a display setting to any one of a first setting to display the image in a first direction regardless of a relative position between the display device and the apparatus body, a second setting to display the image in a second direction regardless of the relative position, and a third setting to automatically switch a display direction of the image between the first and second directions in accordance with the relative position, and control the display direction of the image according to the display setting.

14 Claims, 16 Drawing Sheets

IMAGE CAPTURING APPARATUS HAVING DISPLAY DEVICE, CONTROL METHOD THEREFOR, AND STORAGE MEDIUM STORING CONTROL PROGRAM THEREFOR

BACKGROUND OF THE INVENTION

Field of the Invention

The present invention relates to an image capturing apparatus having a display device, a control method therefor, and a storage medium storing a control program therefor, and particularly, relates to a technique to appropriately display an image on the display device in accordance with positions of the image capturing apparatus and the display device.

Description of the Related Art

A digital camera having a display device capable of changing an angle of a display surface by a variable-angle mechanism or a tilt mechanism has been widely used, and a technique of switching a display state in accordance with the angle of the display surface has been proposed. For example, Japanese Patent Laid-Open Publication No. 2021-136653 discloses a technique for controlling an orientation of an image displayed on a display device in accordance with an open/closed state of the display device and a position of a digital camera. Specifically, the image is displayed as a normal image, a vertically reverse image, or a horizontally reverse image. Further, Japanese Patent Laid-Open Publication No. 2011-103551 (Counterpart of US20110109784 A1) discloses a digital camera capable of arbitrarily changing a display direction of an object image displayed on a display device in accordance with an operation of an operation member regardless of the position of the display device and canceling the changed display direction.

An image capturing apparatus having a display device of which angle is changeable allows image capturing in various methods in addition to normal image capturing of an object in front of a user. For example, high-angle image capturing that captures an image as if looking down from above, low-angle image capturing that captures an image as if looking up from below, bird's-eye image capturing that captures an image of an object directly below from above, looking-up image capturing that captures an image of an object directly above from below, self-image capturing that captures an image of a user itself, etc. are possible.

For example, when a digital camera having a tilt-type display device is used in a state where an opening amount of the display device is small or in a state where the display device is fully opened, the related art does not cause a problem or a sense of discomfort in many cases in changing the display direction.

However, when the display device is half-opened (half-way), possibility that determination of whether the image should be displayed as a normal image or a vertically reverse image by the above image capturing method does not match user's intention increases. For example, when high-angle image capturing or bird's-eye image capturing on a desk is performed, up-and-down of a displayed object image may be reverse when viewed from a user. And it is presumed that the angle serving as a reference for determining whether to display an image in a vertically reverse manner depends on a user. The technique described in the above publications cannot sufficiently cope with such a problem.

SUMMARY OF THE INVENTION

The present invention provides a technique capable of displaying an image more appropriately with a simple operation in an image capturing apparatus that switches image display on a movable display device according to states of a main body of the image capturing apparatus and the display device.

Accordingly, an aspect of the present invention provides an image capturing apparatus including an image capturing device, a display device attached to an apparatus body of the image capturing apparatus so as to be movable between a position where a display surface is directed to an object side where an image capturing object to be captured by the image capturing device exists and a position where the display surface is directed in a direction opposite to the object side, a memory device that stores a set of instructions, and at least one processor that executes the set of instructions to set a display setting of a captured image captured by the image capturing device on the display surface to any one of a first setting to display the captured image in a first direction regardless of a relative position between the display device and the apparatus body, a second setting to display the captured image in a second direction opposite to the first direction regardless of the relative position, and a third setting to automatically switch a display direction of the captured image between the first direction and the second direction in accordance with the relative position, and control the display direction of the captured image on the display device according to the display setting.

According to the present invention, an image is displayed more appropriately with a simple operation in an image capturing apparatus that switches image display on a display device according to states of a main body of the image capturing apparatus and the display device.

Further features of the present invention will become apparent from the following description of exemplary embodiments with reference to the attached drawings.

BRIEF DESCRIPTION OF THE DRAWINGS

FIG. 1B.

FIG. 7B.

DESCRIPTION OF THE EMBODIMENTS

Figure 1A:
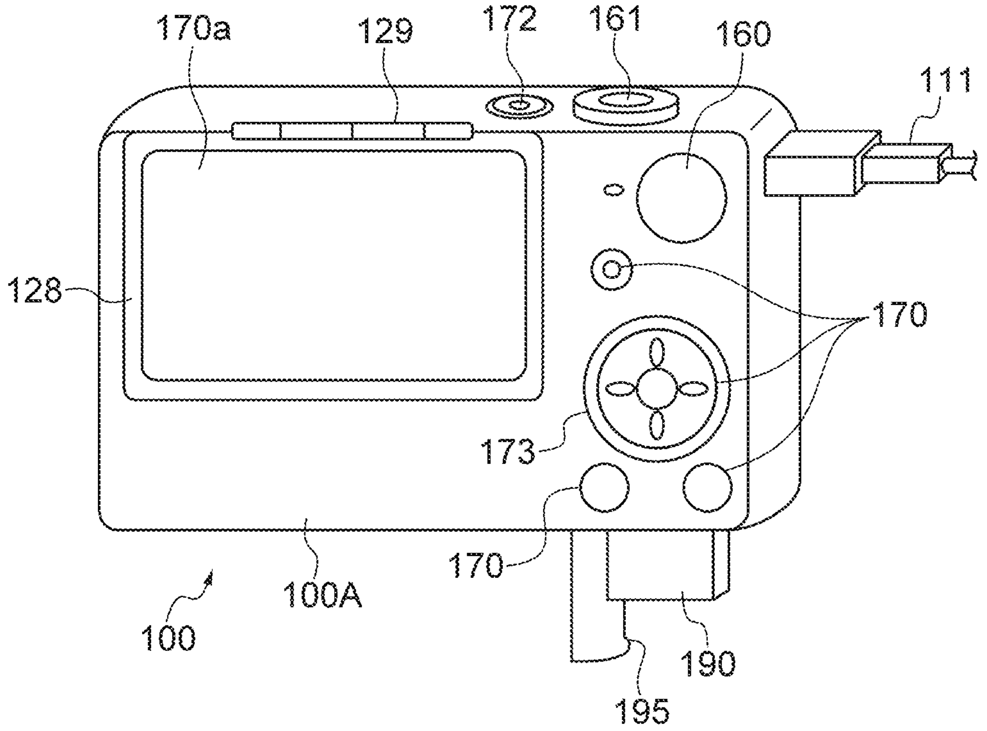
FIG. 1A and FIG. 1B are external perspective views showing a digital camera according to a first embodiment.

Hereafter, embodiments according to the present invention will be described in detail by referring to the drawings. Here, a digital camera is taken as an example of an image capturing apparatus according to the present invention.

Figure 1B:
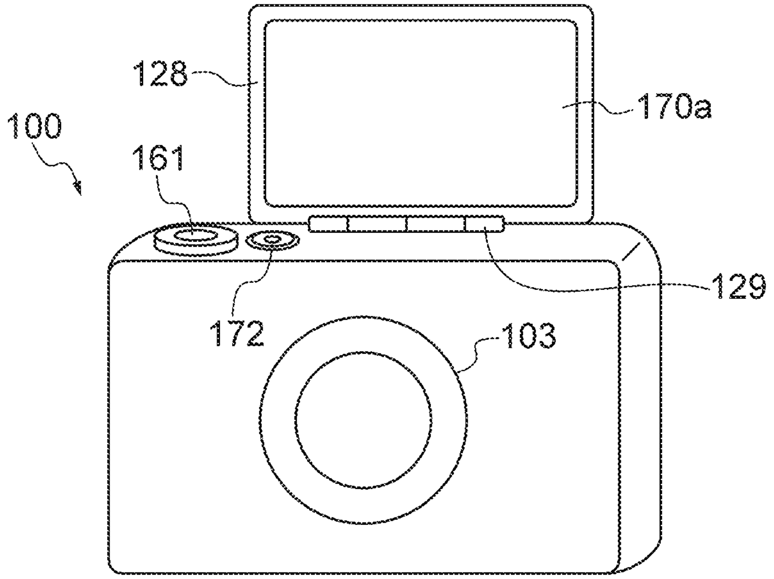

FIG. 1A and FIG. 1B are external perspective views of the digital camera 100 according to the first embodiment. FIG. 1A shows the digital camera 100 viewed from a back side, and FIG. 1B shows the digital camera 100 viewed from a front side. The configuration of the digital camera 100 shown in FIG. 1A and FIG. 1B is also applied to the second embodiment as is.

A power switch 172 and a shutter button 161 are disposed on the top face of the digital camera 100. An image capturing lens system 103 is disposed on the front face of the digital camera 100. And a communication connector (not shown) is disposed on the side face of the digital camera 100. FIG. 1A shows a state in which a communication cable 111 is connected to the communication connector. An external apparatus (not shown) is connected to the other end of the communication cable 111. The digital camera 100 and the external apparatus can exchange various kinds of data via the communication cable 111.

A mode changeover switch 160, a display device 128, a controller wheel 173, and other operation members 170 are disposed on a back face of the digital camera 100. Hereinafter, the portion of the digital camera 100 other than the display device 128 is referred to as an apparatus body 100A. The display device 128 is a liquid-crystal display or an organic EL display that is connected to the apparatus body 100A with a hinge 129, which is a rotation shaft of the display device 128, provided at the upper end of the back face of the apparatus body 100A of the digital camera 100 so as to be movable (rotatable) between a storage position shown in FIG. 1A and an upper forward position shown in FIG. 1B. A touch panel **170*a* is disposed on a display surface of the display device 128** in an overlapping state.

A slot (not shown) for housing a storage medium 190 is provided on the bottom face of the digital camera 100, and the slot can be opened and closed by a slot lid 195. The storage medium 190 can be inserted into and removed from the slot. FIG. 1A shows a state in which the slot lid 195 is opened and the storage medium 190 is being inserted into or removed from the slot. The details of the respective parts shown in FIG. 1A and FIG. 1B will be described together with a description of FIG. 2.

Figure 2:
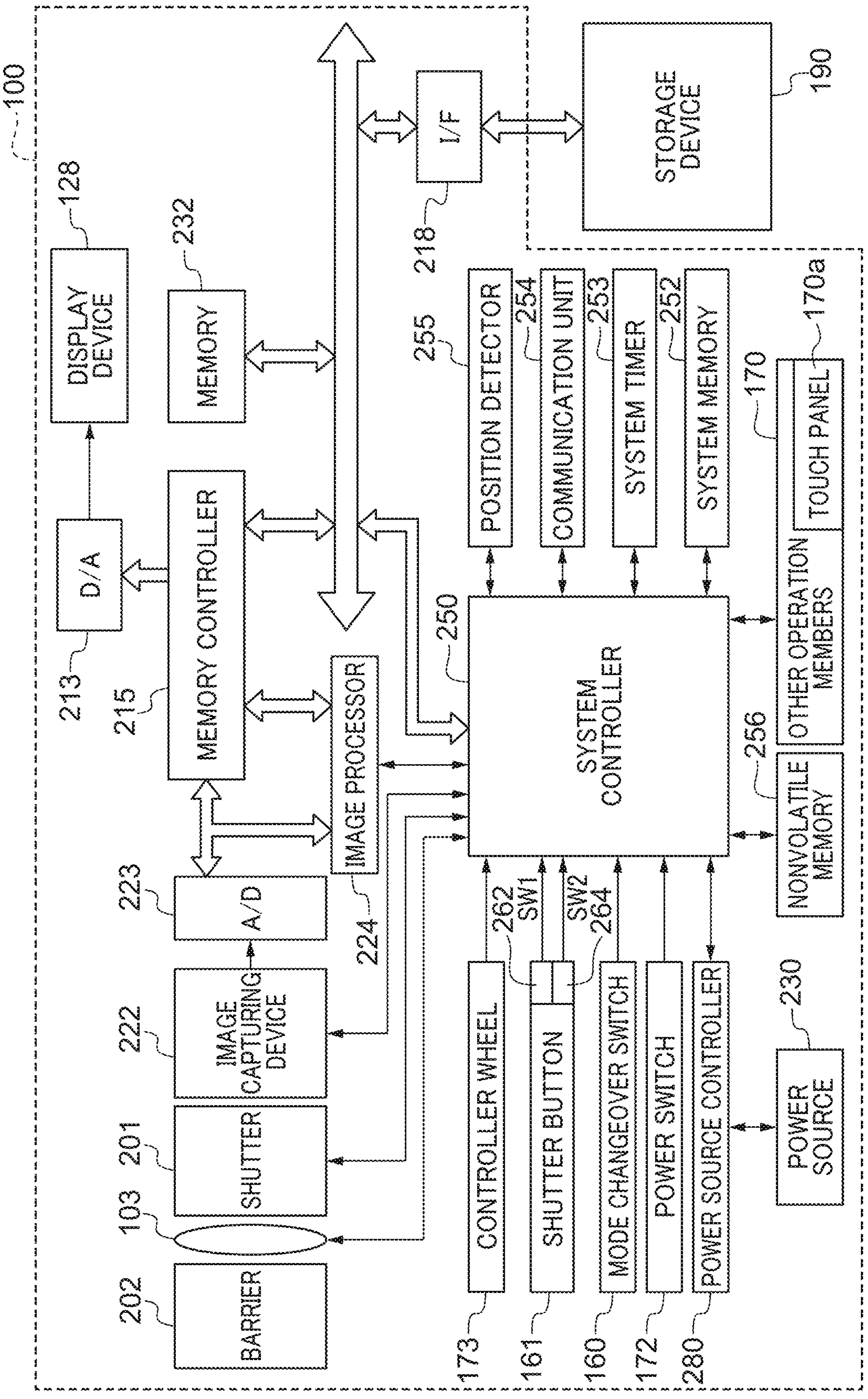
FIG. 2 is a block diagram showing a schematic configuration of and the digital camera shown in FIG. 1A and FIG. 1B.

FIG. 2 is a block diagram showing a schematic configuration of the digital camera 100. The configuration of the digital camera 100 shown in FIG. 2 is also applied to the second embodiment as is.

The digital camera 100 includes a barrier 202, the image capturing lens system 103, a shutter 201, an image capturing device 222, an A/D converter 223, an image processor 224, a memory controller 215, a memory 232, a D/A converter 213, the display device 128, and a system controller 250. The digital camera 100 includes a system memory 252, a nonvolatile memory 256, a system timer 253, a communication unit 254, a position detector 255, the shutter button 161, and the mode changeover switch 160. Further, the digital camera 100 includes the power switch 172, the controller wheel 173, the other operation members 170, a power source controller 280, a power source 230, a storage medium I/F 218, and the storage medium 190.

The barrier 202 covers the image capturing optical system including the image capturing lens system 103 when not capturing an image, thereby preventing contamination or damage of the image capturing optical system including the image capturing lens system 103, the shutter 201, and the image capturing device 222. The image capturing lens system 103 is constituted by a plurality of lens groups, such as a zoom lens group, a focus lens group, and an image stabilization lens group. The shutter 201 has a diaphragm function and controls the adjustment of the amount of light incident on the image capturing device 222 and exposure. The image capturing device 222 includes a CCD element or a CMOS element that converts an optical image into an electric signal.

The A/D converter 223 converts an analog signal output from the image capturing device 222 into a digital signal (image data). The image processor 224 applies predetermined image processes (for example, a pixel interpolation process, a resizing process, a color conversion process, etc.) on the image data output from the A/D converter 223 or the image data obtained from the memory controller 215. Further, the image processor 224 performs a predetermined calculation process using the image data output from the A/D converter 223, and the system controller 250 performs an auto exposure (AE) process, an auto focus (AF) process, and an AWB process of a TTL method, based on the obtained calculation result.

The image data output from the A/D converter 223 is written to the memory 232 via the image processor 224 and the memory controller 215 or via only the memory controller 215. The memory 232 is, for example, a RAM, and stores image data output from the image capturing device 222 and converted by the A/D converter 223, and image data used to display on the display device 128. The memory 232 has a storage capacity capable of storing a predetermined number of still images and a predetermined time of moving images and audio. The memory 232 also serves as an image display memory (a video memory).

The D/A converter 213 converts the data for image display stored in the memory 232 into an analog signal and supplies the analog signal to the display device 128, and thus, the image for display is displayed on the display device 128. The display device 128 displays an image based on an analog signal transmitted from the D/A converter 213. The digital signal that has been A/D converted by the A/D converter 223 and stored in the memory 232 is D/A converted by the D/A converter 213 and is sequentially transferred to the display device 128. As a result, a through image is displayed on the display device 128 (live view display).

The system controller 250 is a control means having at least one processor or circuit. The system controller 250 controls the overall operations of the digital camera 100 by loading various programs stored in the nonvolatile memory 256 into the system memory 252 and running the programs to totally control the respective parts constituting the digital camera 100.

The system controller 250 executes a predetermined program stored in the nonvolatile memory 256 to achieve a process described later with reference to flowcharts. In addition, the system controller 250 controls the memory 232, the D/A converter 213, the display device 128, etc. to control display. The control by the system controller 250 may be performed by one hardware unit, or the entire apparatus may be controlled by a plurality of hardware units sharing the process.

The nonvolatile memory 256 may be, for example, an EEPROM or the like that can electrically erase and store various digital data, and stores constants for operations of the system controller 250, programs, and the like. The system memory 252 is a RAM, for example, to which constants and variables for operations of the system controller 250 and the program read from the nonvolatile memory 256 and the like are developed.

The system timer 253 measures time used for various kinds of control and time of a built-in clock. The communication unit 254 includes the communication connector (not shown) described with reference to FIG. 1A, is connected to an external apparatus (not shown) through the communication cable 111, and transmits and receives a video signal, an audio signal, and the like to and from the external apparatus. The communication unit 254 can be connected to a wireless LAN or the Internet by wireless communication.

The position detector 255 detects angular positions (attitudes) of the apparatus body 100A of the digital camera 100 and the display device 128 with respect to the gravity direction. Specifically, the angular position of the apparatus body 100A of the digital camera 100 is detected in a range of 0° (0 degrees) or more and less than 360° (360 degrees), and the angular position of the display device 128 is detected in a range between 0° in the storage position shown in FIG. 1A and 180° in the fully opened upward front position shown in FIG. 1B. This enables to obtain a relative angle that is an open angle of the display device 128 with respect to the apparatus body 100A of the digital camera 100 and an absolute angle of the display device 128 with respect to the gravity direction. That is, the position detector 255 has a function of a first detector detecting the relative angle and a function of a second detector detecting the absolute angle.

The position detector 255 uses an acceleration sensor, a gyrosensor, or the like. The position detector 255 also detects movements (pan, tilt, lift, etc.) and a stationary state of the digital camera 100. The relative angle may be detected by a sensor that directly detects the rotation angle of the display device 128 with respect to the apparatus body 100A of the digital camera 100.

The shutter button 161 is an operation member for the user to instruct the digital camera 100 to capture an image, and turns a first shutter switch 262 and a second shutter switch 264. The first shutter switch 262 turns ON when the shutter button 161 is pressed in middle (half-press) and generates a first shutter switch signal SW1. When receiving the first shutter switch signal SW1, the system controller 250 performs image capturing preparation operations (AF, AE, AWB, etc.). The second shutter switch 264 turns ON when the shutter button 161 is fully pressed (full-press) and generates a second shutter switch signal SW2. When receiving the second shutter switch signal SW2, the system controller 250 performs a series of image capturing processes from signal reading by the image capturing device 222 to writing of image data to the storage medium 190.

The mode changeover switch 160 is an operation member for switching an operation mode of the system controller 250 to any one of a still image recording mode, a moving image capturing mode, a live distribution mode, a preview distribution mode, a reproduction mode, and the like. The power switch 172 is an operation member for switching ON/OFF of the power of the digital camera 100. The controller wheel 173 is an operation member that allows a rotation operation and is used for instructing a selection item together with a cross button (direction button). The other operation members 170 include switches and buttons (for example, an end button, a back button, an image feed button, a menu button, a cross button, and a SET button) that receive various operations from the user, a touch panel 170*a*, and the like. The touch panel 170*a* is disposed to overlap the display surface of the display device 128. The system controller 250 detects various known operations on the touch panel 170*a*.

The power source controller 280 is configured by a battery detection circuit, a DC-DC converter, a switch circuit for switching a block to be energized, and the like. The power source controller 280 detects attachment of a battery, a type of the battery, and a remaining battery level, and supplies a necessary voltage to blocks including the storage medium 190 for a necessary period in accordance with the detection result and an instruction from the system controller 250. The power source 230 is a primary battery such as an alkaline battery or a lithium battery, a secondary battery such as a NiCd battery, a NiMH battery, or a Li battery, an AC adapter, or the like.

The storage medium I/F 218 is an interface that enables communication between the storage medium 190 and the system controller 250. The storage medium 190 is specifically a memory card or the like, but is not limited thereto as long as the storage medium can store the image data and the like.

FIG. 3A to FIG. 3E are views describing the relative angle and the absolute angle of the display device 128 in the digital camera 100 and simply show examples of positions of the apparatus body 100A and the display device 128 of the digital camera 100. Aspects of the digital camera 100 shown in FIG. 3A to FIG. 3E are applied to the second embodiment as is.

Figure 3A:
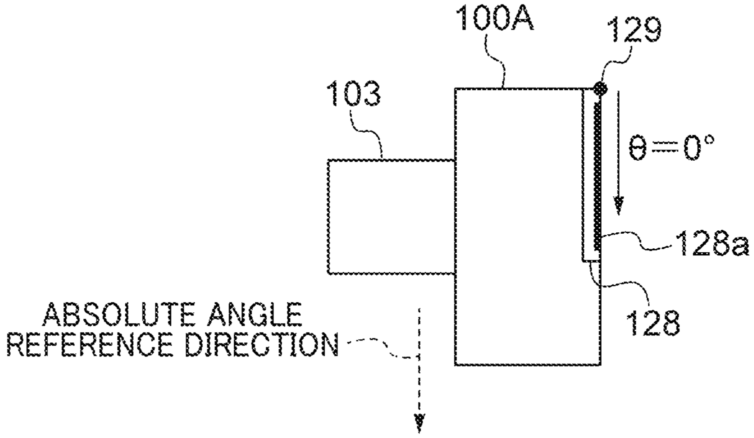
FIG. 3A to FIG. 3E are views showing a relative angle and an absolute angle of a display device of the digital camera shown in FIG. 1A.

FIG. 3A shows a state where an optical axis of the image capturing lens system 103 of the digital camera 100 is parallel to a horizontal direction and is directed in a left direction that is an object side in which an image capturing object exists and where the display surface 128*a* of the display unit 128 is directed in a right direction that is opposite to the object side. The absolute angle θ is defined as an angle formed between the gravity direction as a reference direction and a direction from the hinge 129, which is the rotation shaft of the display device 128, toward a rotation end of the display device 128. In the state in FIG. 3A, the relative angle (open angle) of the display unit 128 is 0°, and the absolute angle θ is also 0°.

Figure 3B:
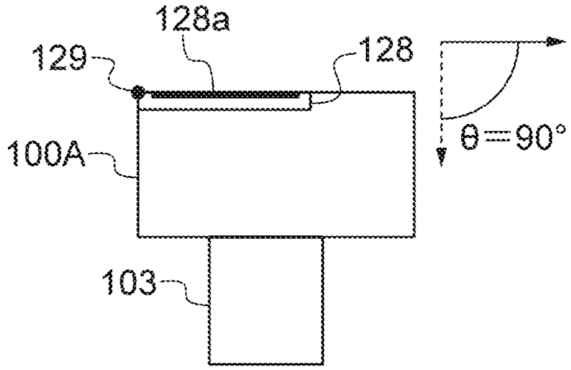

FIG. 3B shows a state where the optical axis of the image capturing lens system 103 is parallel to the gravity direction and is directed in a lower direction and the display surface 128*a* is directed upward because the display device 128 is in the storage position. In this case, the relative angle of the display device 128 is 0°, and absolute angle is 90°. About the absolute angle, a counterclockwise (CCW) direction is defined as a positive direction.

Figure 3C:
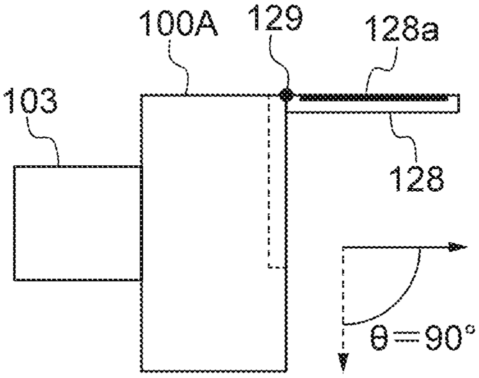

FIG. 3C shows a state where the optical axis of the image capturing lens system 103 is parallel to the horizontal direction and is directed in the left direction and the display surface 128*a* is directed upward by rotating the display device 128 by 90° from the storage position to the upper side of the apparatus body 100A. In this case, the relative angle of the display device 128 is 90°, and the absolute angle is also 90°.

Figure 3D:
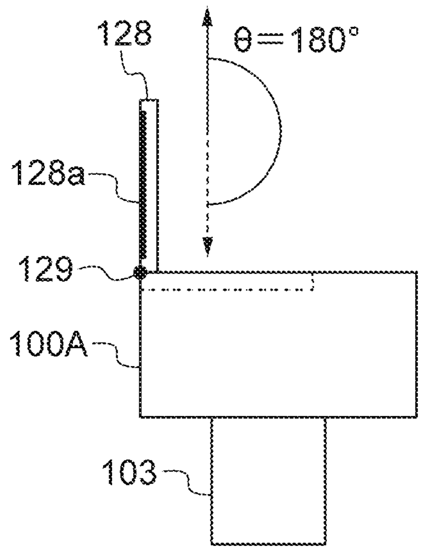

FIG. 3D shows a state where the optical axis of the image capturing lens system 103 is parallel to the gravity direction and is directed downward and the display surface 128*a* is directed leftward by rotating the display device 128 from the storage position toward the upper side of the apparatus body 100A by 90°. In this case, the relative angle of the display device 128 is 90°, and the absolute angle is 180°.

Figure 3E:
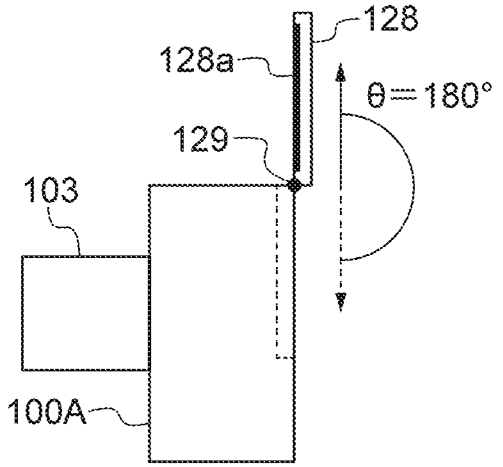

FIG. 3E shows a state where the optical axis of the image capturing lens system 103 is parallel to the horizontal direction and is directed in the left direction and the display surface 128*a* of the display device 128 is directed in the left direction by rotating the display unit 128 from the storage position to the upper side of the apparatus body 100A by 180°. In this case, the relative angle of the display device 128 is 180°, and the absolute angle is also 180°. In addition, the display device 128 is above the apparatus body 100A and the display surface 128*a* is directed to the object side. Although a state where the optical axis of the image capturing lens system 103 is parallel to the gravity direction and is directed upward and the like are not shown, the relative angle of the display device 128 can be detected in the range of 0° or more and 180° or less and the absolute angle can be detected in the range of 0° or more and less than 360° as described above.

Next, an entire-range display setting for the display unit 128 will be described. The system controller 250 controls a display mode of the captured image on the display unit 128 during image capturing by the digital camera 100 according to the angular positions of the apparatus body 100A and the display unit 128 based on the entire-range display setting.

Figure 4A:
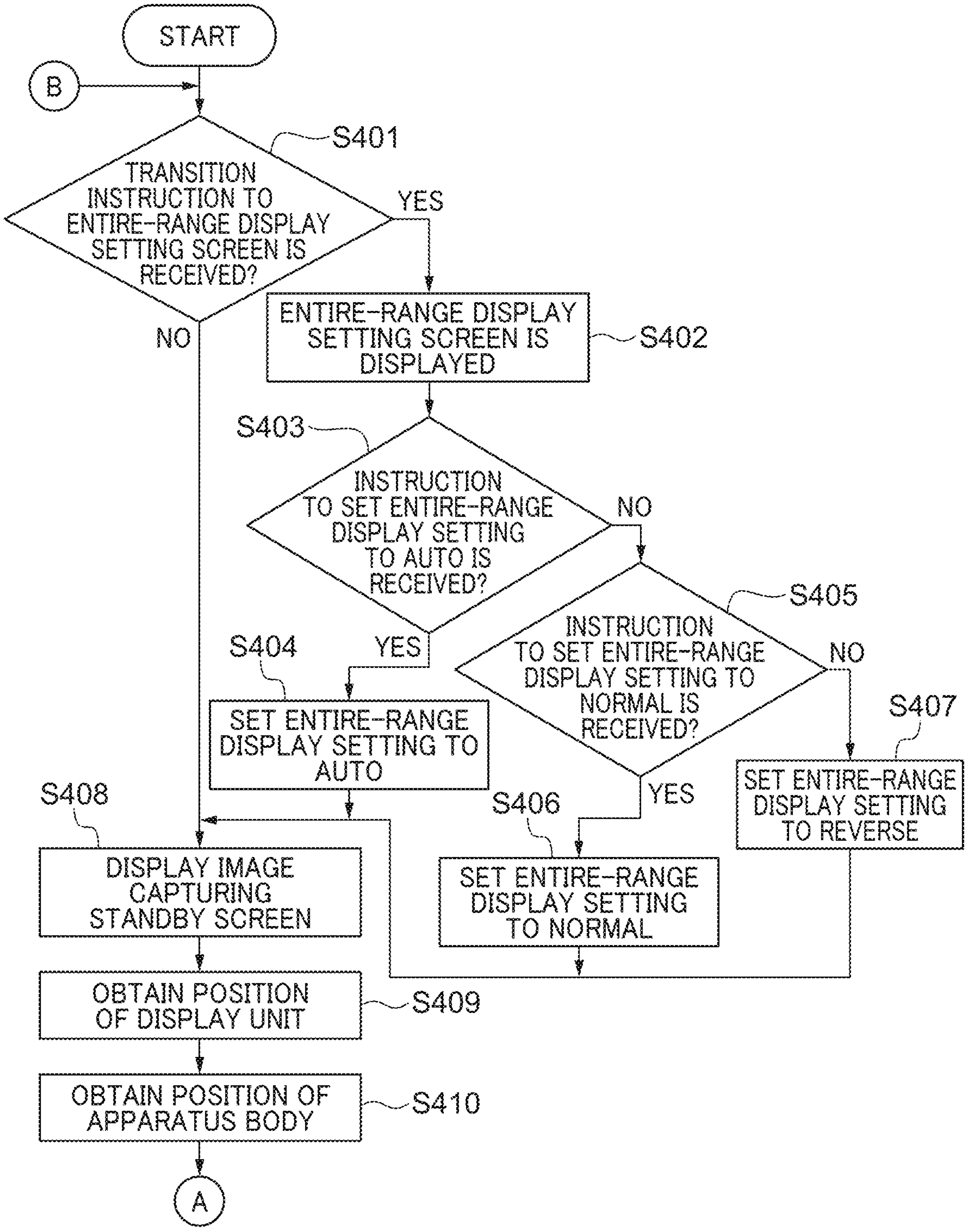
FIG. 4A and FIG. 4B are flowcharts showing a display direction setting process to set a display direction of an object image displayed on a display device of the digital camera in the first embodiment.
Figure 4B:
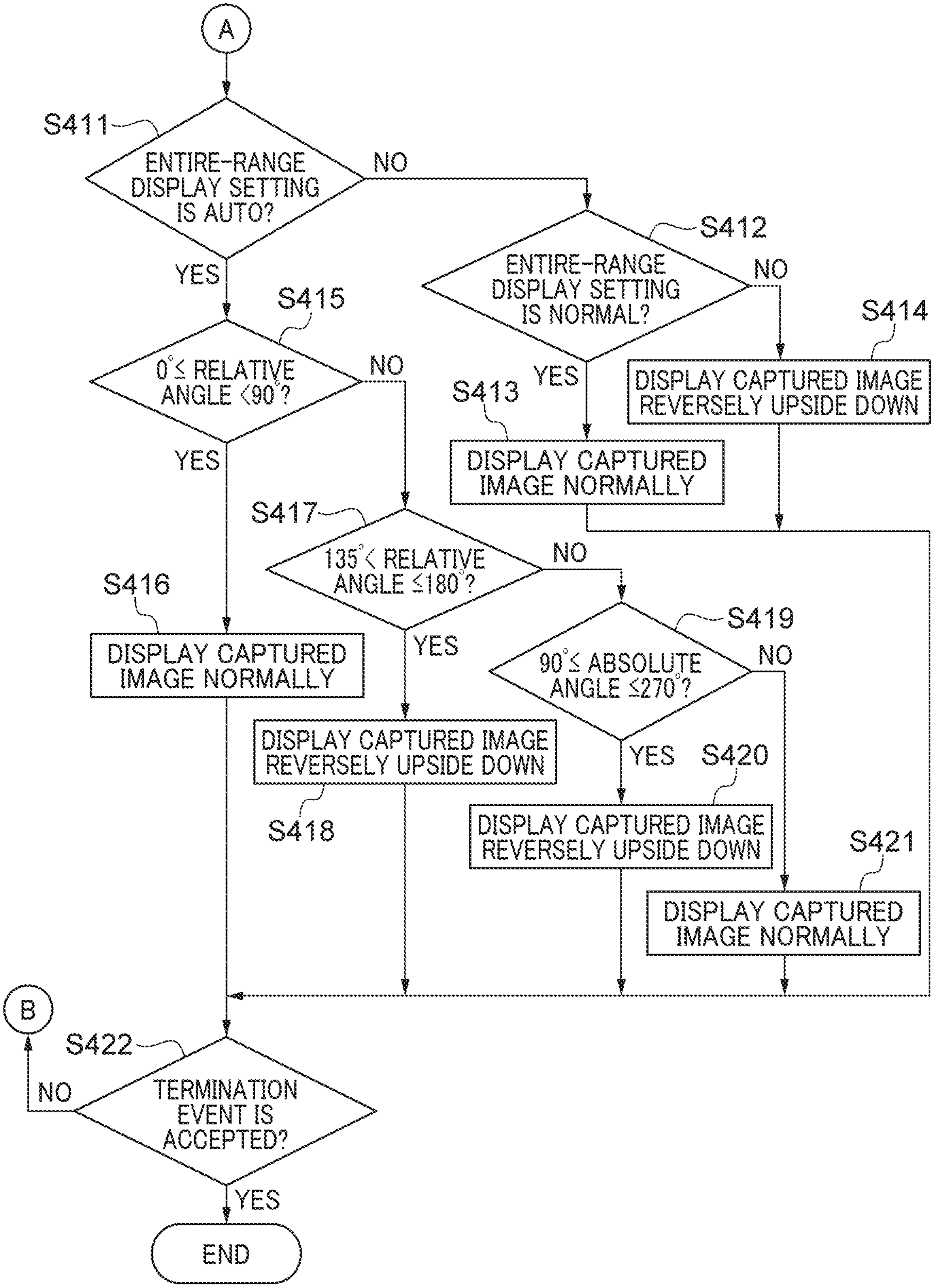

FIG. 4A and FIG. 4B are flowcharts showing a display direction setting process on the display device 128 according to the first embodiment. Each process (step) indicated by an S number in the flowcharts is achieved by the system controller 250 developing the program stored in the non-volatile memory 256 onto the system memory 252 and running the program so as to integrally control operations of the blocks of the digital camera 100.

In S401, the system controller 250 determines whether a transition instruction to an entire-range display setting screen is received. Note that the entire-range display setting screen can be displayed on the display device 128 by an operation of a menu button included in the other operation members 170. When determining that the transition instruction to the entire-range display setting screen is received (YES in S401), the system controller 250 executes a process of S402. When determining that the transition instruction is not received (NO in S401), the system controller 250 executes a process of S408.

In S402, the system controller 250 displays the entire-range display setting screen on the display device 128. In the entire-range display setting screen, although not shown, the entire-range display setting can be selected from "auto", "normal", and "reverse", and "auto" is set as a default.

In S403, the system controller 250 determines whether an instruction to set the entire-range display setting to "auto" is received. Note that on the entire-range display setting screen, for example, an item can be selected or determined by an operation of the cross button or the SET button, or by a touch operation on the touch panel 170*a* overlapped on the display unit 128.

When determining that the instruction to set the entire-range display setting to "auto" is received (YES in S403), the system controller 250 executes a process of S404. When determining that the instruction to set the entire-range display setting to other than "auto" is received (NO in S403), the system controller 250 executes a process of S405.

The system controller 250 sets the entire-range display setting to "auto" and stores it in the memory 232 in S404 (a third setting), and then executes a process of S408.

In S405, the system controller 250 determines whether an instruction to set the entire-range display setting to "normal" is received. When determining that the instruction to set the entire-range display setting to "normal" is received (YES in S405), the system controller 250 executes the process of S406. When determining that the instruction to set the entire-range display setting to other than "normal" is received (NO in S405), the system controller 250 executes a process of S407. When the entire-range display setting is not "normal", the entire-range display setting is "reverse" that is the remaining choice. Examples of the entire-range display setting screen are described below.

The system controller 250 sets the entire-range display setting to "normal" (a first direction) and stores it in the memory 232 in S406 (a first setting), and then executes the process of S408. The system controller 250 sets the entire-range display setting to "reverse" (a second direction) and stores it in the memory 232 in S407 (a second setting), and then executes the process of S408. The term "reverse" means "reverse in the vertical direction".

In S408, the system controller 250 displays an image capturing standby screen on the display device 128. In S409, the system controller 250 detects the current position (attitude) of the display unit 128 by the position detector 255.

In S410, the system controller 250 detects the current position (attitude) of the apparatus body 100A of the digital camera 100 by the position detector 255. According to the detection results in S409 and S410, the system controller 250 can obtain the relative angle and the absolute angle of the display device 128.

In S411 in FIG. 4B, the system controller 250 determines whether the entire-range display setting is "auto". When determining that entire-range display setting is "auto" (YES in S411), the system controller 250 executes a process of S415. When determining that the entire-range display setting is not "auto" (No in S411), the system controller 101 executes a process of S412.

In S412, the system controller 250 determines whether the entire-range display setting is "normal". When determining that entire-range display setting is "normal" (YES in S412), the system controller 250 executes a process of S413. When determining that entire-range display setting is not "normal" (NO in S412), the system controller 101 executes a process of S414. When the determination result of S412 is "NO", the entire-range display setting is necessarily set to "reverse".

The system controller 250 displays the captured image as a normal image on the display device 128 in S413 and then executes a process of S422. The system controller 250 displays the captured image as a vertically reverse image on the display device 128 in S414, and then executes the process of S422.

In S415 to S421, a display direction is switched according to the relative angle and the absolute angle of the display device 128. In S415, the system controller 250 determines whether the relative angle of the display device 128 is in a range of 0° or more and less than 90° (a first angular range). When determining that the relative angle of the display device 128 is in the range of 0° or more and less than 90° (YES in S415), the system controller 250 executes a process of S416. When determining that the relative angle is not in the range of 0° or more and less than 90° (NO in S415), the system controller 250 executes a process of S417.

The system controller 250 displays the captured image as a normal image (i.e., displays the captured image normally) on the display device 128 in S416 and then executes the process of S422.

In S417, the system controller 250 determines whether the relative angle of the display device 128 is in a range of more than 135° and 180° or less (a second angular range). When determining that the relative angle of the display device 128 is in the range of more than 135° and 180° or less (YES in S417), the system controller 250 executes a process of S418. When determining that the relative angle is not in the range of more than 135° and 180° or less (NO in S417), the system controller 250 executes a process of S419.

The system controller 250 displays the captured image as a vertically reverse image (i.e., displays the captured image reversely upside down) on the display device 128 and then executes the process of S422.

In S419, the system controller 250 determines whether the absolute angle of the display device 128 is in a range of 90° or more and 270° or less (a third angular range). As a result of the processing contents in S415 and S417, the relative angle of the display device 128 is in a range of 90° or more and 135° or less in S419.

When determining that the absolute angle of the display device 128 is in the range of 90° or more and 270° or less (YES in S419), the system controller 250 executes a process of S420. When determining that the absolute angle is not in the range of 90° or more and 270° or less (NO in S419), the system controller 250 executes a process of S421. When the absolute angle is not in the range of 90° or more and 270° or less, the absolute angle is in a range of 0° or more and less than 90° or in a range of more than 270° and less than 360°.

The system controller 250 displays the captured image as the vertically reverse image on the display device 128 in S420 and then executes the process of S422. The system controller 250 displays the captured image as the normal image on the display device 128 in S421, and then executes the process of S422.

In S422, the system controller 250 determines whether a termination event, such as a power off operation of the digital camera 100 by the power switch 172, is accepted. When determining that the termination event is received (YES in S422), the system controller 250 ends the present process. When determining that the termination event is not accepted (NO in S422), the system controller 250 returns the process to S401.

As described above, in the display direction setting process in the first embodiment, when the entire-range display setting is set to "auto", the image capturing can be performed while automatically switching the display direction of the captured image according to the relative angle and the absolute angle of the display device 128. In addition, when capturing an image in a specific image capturing scene, such as high-angle image capturing or image capturing of an object on a desk directly below the digital camera 100, a user can capture an image while fixing the display direction of the captured image by setting the entire-range display setting to "normal" or "reverse".

Figure 5A:
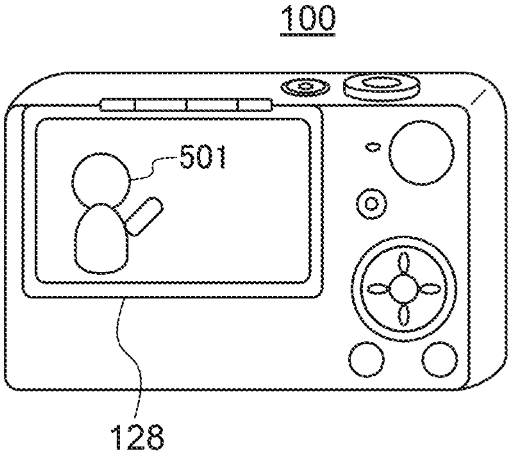
FIG. 5A to FIG. 5D are views showing image display examples on the display device according to the flowcharts in FIG. 4A and FIG. 4B.
Figure 5B:
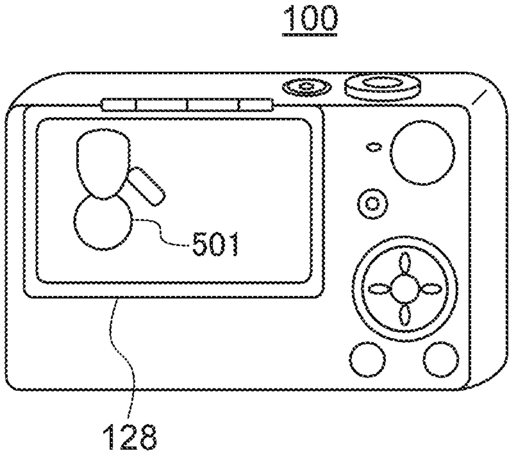
Figure 5C:
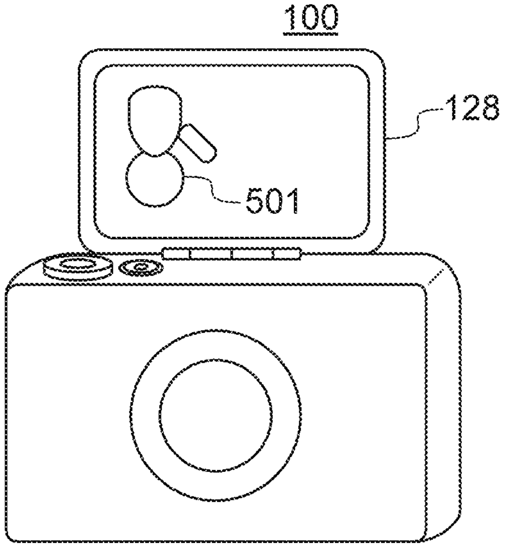
Figure 5D:
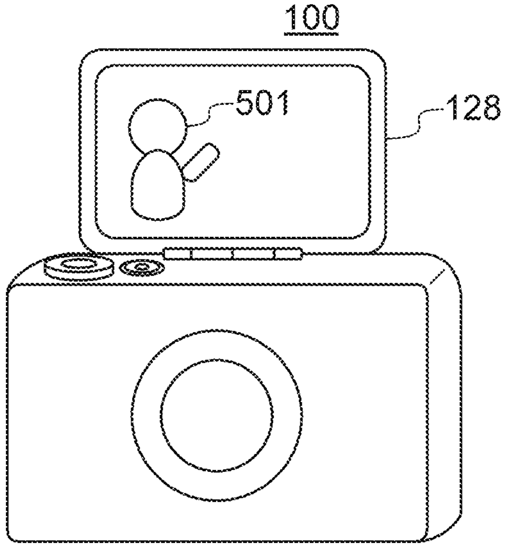

FIG. 5A to FIG. 5D are views showing image display examples on the display device 128 according to the flowcharts in FIG. 4A and FIG. 4B. FIG. 5A shows an image display example in a case where the entire-range display setting is set to "normal" or "auto" and the relative angle is 0°. As shown in FIG. 5A, when the display device 128 is viewed from the back side of the digital camera 100, an object image 501 is displayed in a normal manner. FIG. 5B shows an image display example in a case where the entire-range display setting is set to "reverse" and the relative angle is 0°. As shown in FIG. 5B, when the display device 128 is viewed from the back side of the digital camera 100, the object image 501 is displayed in a vertically reverse manner. FIG. 5C shows an image display example in the case where the entire-range display setting is set to "normal" and the relative angle is 180°. As shown in FIG. 5C, when the display device 128 is viewed from the front side of the digital camera 100, the object image 501 is displayed in the vertically reverse manner. FIG. 5D shows an image display example in the case where the entire-range display setting is set to "reverse" or "auto" and the relative angle is 180°. As shown in FIG. 5D, when the display device 128 is viewed from the front side of the digital camera 100, the object image 501 is displayed in the normal manner.

Next, a second embodiment will be described. In the first embodiment, the display direction of the image is automatically switched according to the relative angle and the absolute angle of the display device 128 when the entire-range display setting is set to "auto", and the display direction of the image is fixed when the entire-range display setting is set to "normal" or "reverse". In contrast, in the second embodiment, when the entire-range display setting is "auto", a half-open display setting can be further set to any of "auto", "normal", and "reverse". The entire-range display setting is applied to the range of the relative angle of the display device 128 that is 0° or more and 180° or less as described above. In contrast, the half-open display setting is applied to a range of the relative angle of the display device 128 that is 90° or more and 135° or less, which enables finer display control according to the relative angle of the display device 128.

Figure 6A:
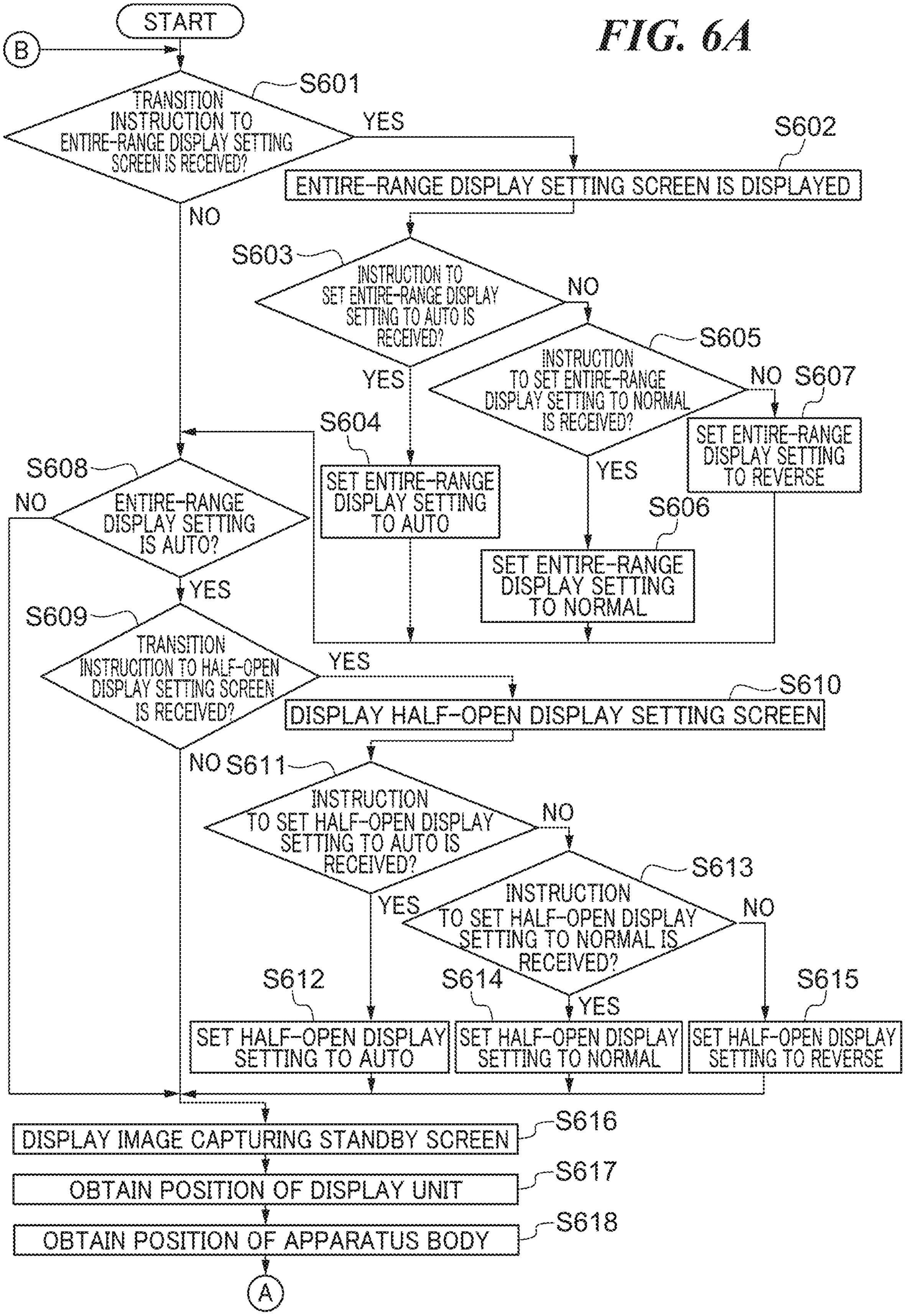
FIG. 6A and FIG. 6B are flowcharts showing a display direction setting process to set a display direction of an object image displayed on a display device of a digital camera in a second embodiment.
Figure 6B:
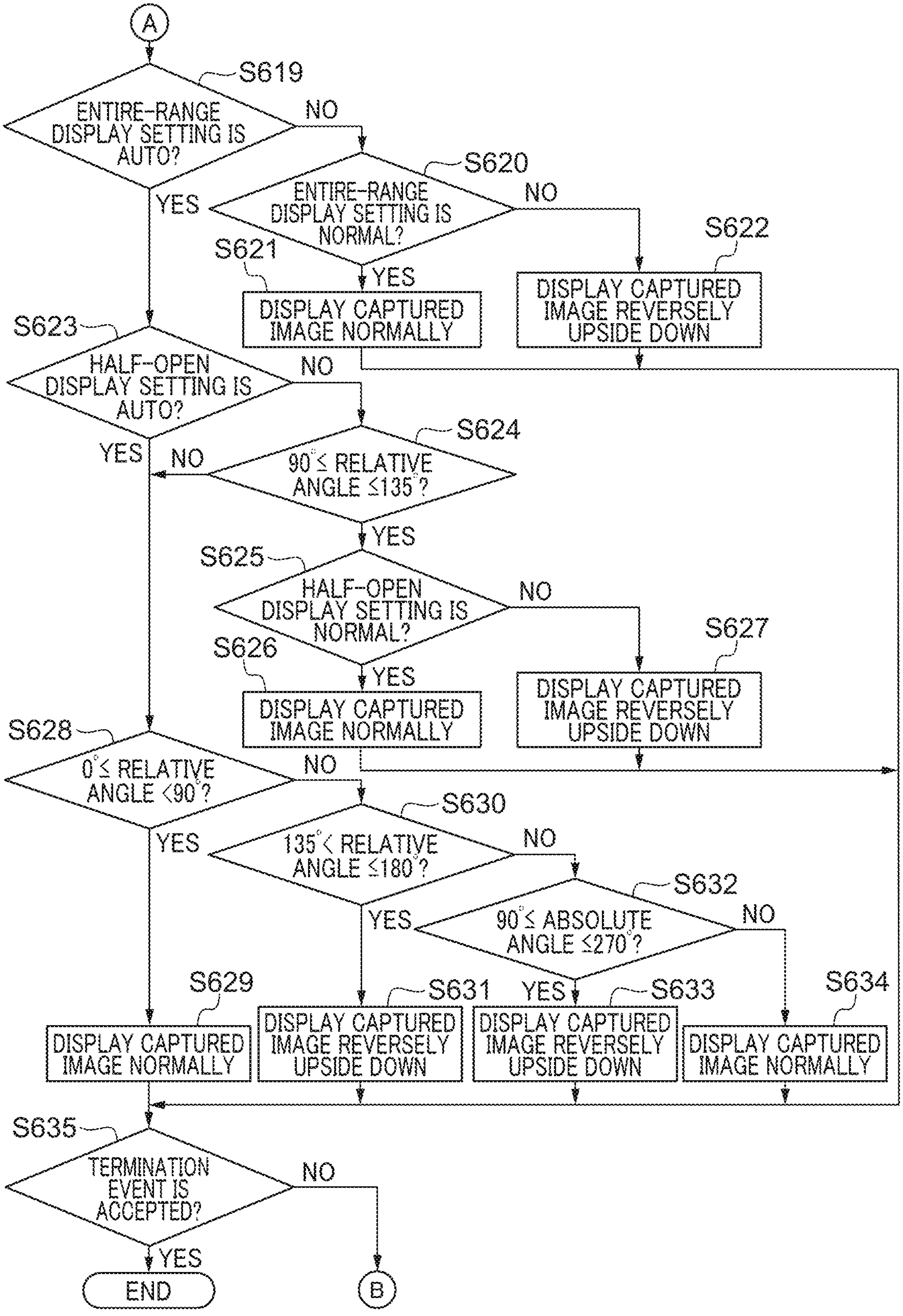

FIG. 6A and FIG. 6B are flowcharts showing a display direction setting process to set a display direction of an image on the display device 128 according to the second embodiment. Each process (step) indicated by an S number in the flowcharts is achieved by the system controller 250 developing the program stored in the nonvolatile memory 256 onto the system memory 252 and running the program so as to integrally control operations of the blocks of the digital camera 100.

Processes from S601 to S607 are the same as the processes from S401 to S407 of the flowchart in FIG. 4A in the first embodiment, and thus the descriptions thereof will be omitted.

In S608, the system controller 250 determines whether the entire-range display setting is "auto". When determining that the entire-range display setting is "auto" (YES in S608), the system controller 250 executes a process of S609. When determining that the entire-range display setting is not "auto" (NO in S608), the system controller 250 executes a process of S616.

In S609, the system controller 250 determines whether a transition instruction to a half-open display setting screen is received. For example, as described above, the entire-range display setting can be selected from "automatic", "normal", and "reverse" on the entire-range display setting screen. In addition, although not shown, the half-open display setting can be selected when "auto" is selected on the entire-range display setting screen in the second embodiment. When "normal" or "reverse" is selected on the entire-range display setting screen, the half-open display setting is not selectable.

When determining that the transition instruction to the half-open display setting screen is received (YES in S609), the system controller 250 executes a process of S610. When determining that the transition instruction is not received (NO in S609), the system controller 250 executes the process of S616.

In S610, the system controller 250 displays the half-open display setting screen on the display device 128. A default of the half-open display setting is "auto".

In S611, the system controller 250 determines whether an instruction to set the half-open display setting to “auto” is received. In the half-open display setting screen, for example, the item can be selected and determined using the cross button or the SET button. When determining that the instruction to set the half-open display setting to “auto” (YES in S611), the system controller executes a process of S612. When determining that the instruction to set the half-open display setting to other than “auto” (NO in S611), the system controller 250 executes a process of S613.

The system controller 250 sets the half-open display setting to “auto” and stores it in the memory 232 in S612 (a sixth setting), and then executes the process of S616.

In S613, the system controller 250 determines whether an instruction to set the half-open display setting to “normal”. The instruction not to set the half-open display setting to “normal” is an instruction to set the half-open display setting to “reverse” that is the remaining choice. When determining that the instruction to set the half-open display setting to “normal” is received (YES in S613), the system controller 250 executes a process of S614. When determining that the instruction to set the half-open display setting to other than “normal” is received (NO in S613), the system controller 250 executes a process of S615.

The system controller 250 sets the half-open display setting to “normal” (a first direction) and stores it in the memory 232 in S614 (a fourth setting), and then executes the process of S616. The system controller 250 sets the half-open display setting to “reverse” (a second direction) and stores it in the memory 232 in S615 (a fifth setting), and then executes the process of S616. Examples of the half-open display setting screen will be described later.

The processes from S616 to S618 are the same as the processes from S408 to S410 of the flowchart in FIG. 4A in the first embodiment, and thus the descriptions thereof will be omitted. The system controller 250 executes a process of S619 of the flowchart in FIG. 6B after the process of S618.

In S619, the system controller 250 determines whether the entire-range display setting is “auto”. When determining that the entire-range display setting is “auto” (YES in S619), the system controller 250 executes a process of S623. When determining that the entire-range display setting is not “auto” (NO in S619), the system controller 101 executes a process of S620.

In S620, the system controller 250 determines whether the entire-range display setting is “normal”. When determining that the entire-range display setting is “normal” (YES in S620), the system controller 250 executes a process of S621. When determining that the entire-range display setting is not “normal” (NO in S620), the system controller 250 executes a process of S622.

The system controller 250 displays the captured image as a normal image on the display 128 in S621 and then executes a process of S635. Since the entire-range display setting in the case where it is determined that the entire-range display setting is not “normal” in S620 is “reverse” that is the remaining choice, the system controller 250 displays the captured image as a vertically reverse image on the display device 128 in S622, and then executes the process of S635.

In S623, the system controller 250 determines whether the half-open display setting is “auto”. When determining that the half-open display setting is “auto” (YES in S623), the system controller 250 executes a process of S628. When determining that the half-open display setting is not “auto” (NO in S623), the system controller 250 executes a process of S624.

In S624, the system controller 250 determines whether the relative angle of the display device 128 is in the range of 90° or more and 135° or less. When determining that the relative angle of the display device 128 is in the range of 90° or more and 135° or less (YES in S624), the system controller 250 executes a process of S625. When determining that the relative angle is not in the range of 90° or more and 135° or less (NO in S624), the system controller 250 executes the process of S628.

In S625, the system controller 250 determines whether the half-open display setting is “normal”. When determining that the half-open display setting is “normal” (YES in S625), the system controller 250 executes a process of S626. When determining that the half-open display setting is not “normal” (NO in S625), the system controller 250 executes a process of S627.

The system controller 250 displays the captured image as a normal image on the display 128 in S626 and then executes the process of S635. Since the half-open display setting in the case where it is determined that the half-open display setting is not “normal” in S625 is “reverse” that is the remaining choice, the system controller 250 displays the captured image as a vertically reverse image on the display device 128 in S627, and then executes the process of S635.

Processes from S628 to S635 are the same as the processes from S415 to S422 of the flowchart of FIG. 4B in the first embodiment. That is, the display control in the case where the half-open setting is “auto” is the same as that in the case where the entire-range display setting is “auto”, and thus the description thereof will be omitted here. As described above, when it is determined that relative angle is not in the range of 90° or more and 135° or less in S624 (NO in S624), a process of S628 is executed. That is, when the relative angle is not in the range of 90° or more and 135° or less, the half-open display setting of “normal” or “reverse” is disabled even if it is determined that the half-open display setting is “normal” or “reverse” in S623. When the determination result of S635 is “NO”, the system controller 250 returns the process to S601 of the flowchart in FIG. 6A.

As described above, in the display direction setting process in the second embodiment, when the entire-range display setting and the half-open display setting are set to “auto”, the image capturing can be performed while automatically switching the display direction of the captured image according to the relative angle and the absolute angle of the display device 128. In addition, when capturing an image in a specific image capturing scene, such as high-angle image capturing or image capturing of an object on a desk directly below the digital camera 100, a user can capture an image while fixing the display direction of the captured image by setting the entire-range display setting and the half-open display setting to “normal” or “reverse”.

Figure 7A:
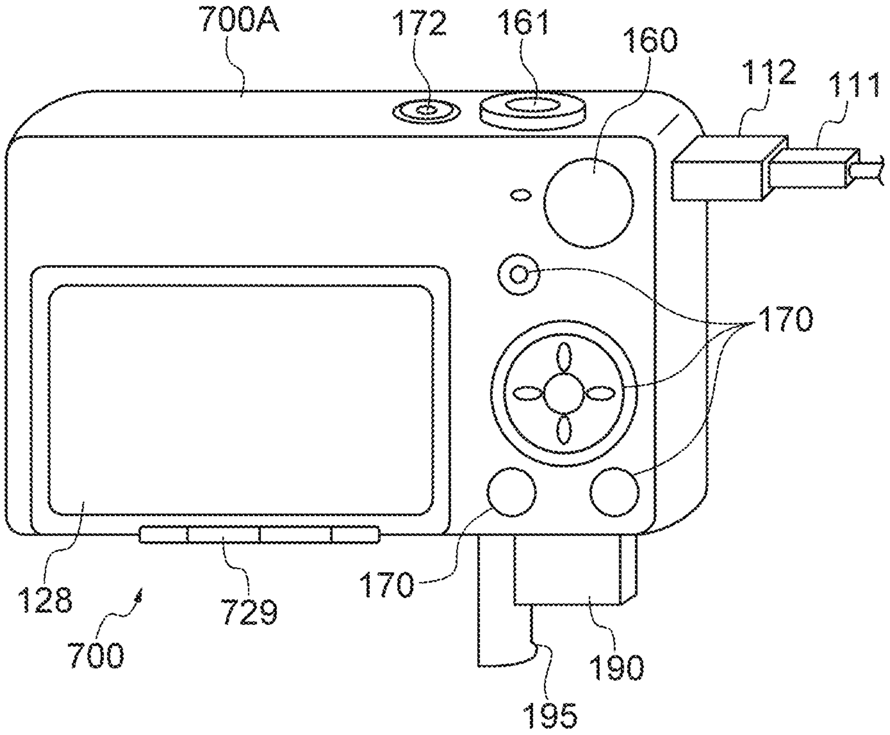
FIG. 7A and FIG. 7B are external perspective views showing a digital camera according to a third embodiment.
Figure 7B:
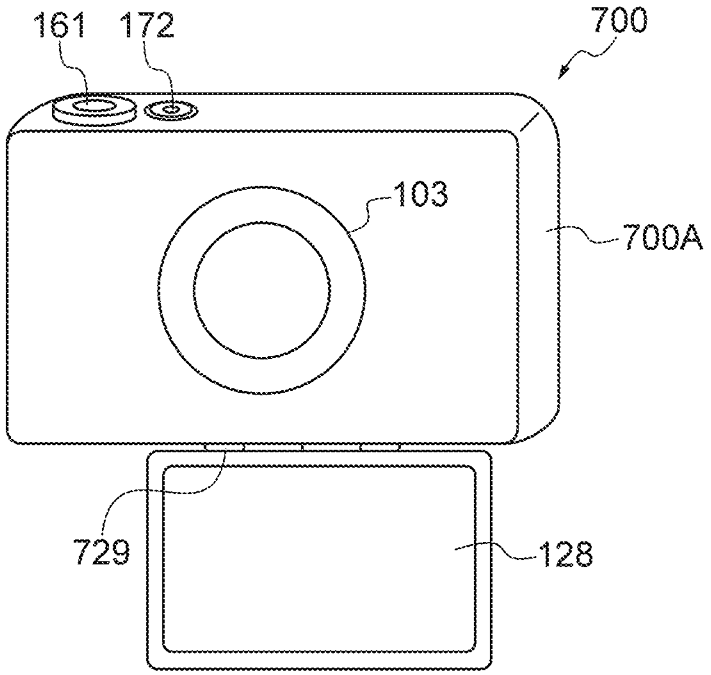

Next, a third embodiment will be described. FIG. 7A and FIG. 7B are external perspective views showing a digital camera 700 according to the third embodiment. FIG. 7A shows the digital camera 700 viewed from the back side, and FIG. 7B shows the digital camera 700 viewed from the front side.

The digital camera 700 is different from the digital camera 100 according to the first embodiment only in an attachment position and a rotating direction of the display device 128 with respect to an apparatus body 700A. The other components of the digital camera 700 are the same as the components of the digital camera 100. Therefore, the same reference numerals are given to the same components of the digital camera 700 as those of the digital camera 100, and the descriptions thereof will be omitted.

In the digital camera 700, the display device 128 is rotatable with respect to the apparatus body 700A between the storage position shown in FIG. 7A and a lower forward position shown in FIG. 7B around a hinge 729 provided at the lower end of the back face of the apparatus body 700A of the digital camera 700. A positive direction of an open angle is defined as a rotatable direction from the storage position. Therefore, the open angle of the display device 128 in the digital camera 700 is also represented by a positive value in the same manner as the open angle of the display device 128 in the digital camera 100.

FIG. 8A to FIG. 8E are view describing the relative angle and the absolute angle of the display device 128 in the digital camera 700 and simply show examples of positions of the apparatus body 700A and the display device 128 of the digital camera 700.

Figure 8A:
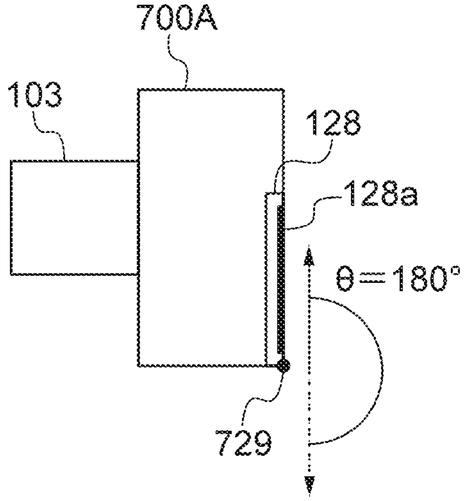
FIG. 8A to FIG. 8E are views showing a relative angle and an absolute angle of a display device of the digital camera shown in FIG. 7A.

FIG. 8A shows a state where an optical axis of the image capturing lens system 103 of the digital camera 700 is parallel to a horizontal direction and is directed in a left direction that is an object side in which an image capturing object exists and where the display surface 128*a* of the display unit 128 is directed in a right direction that is opposite to the object side. Here, similarly to the digital camera 100, the absolute angle θ is defined as an angle formed between the gravity direction as a reference direction and a direction from the hinge 729, which is a rotation axis of the display device 128, toward a rotation end of the display device 128. In the state in FIG. 8A, the relative angle (open angle) of the display device 128 is 0°, and the absolute angle is 180°.

Figure 8B:
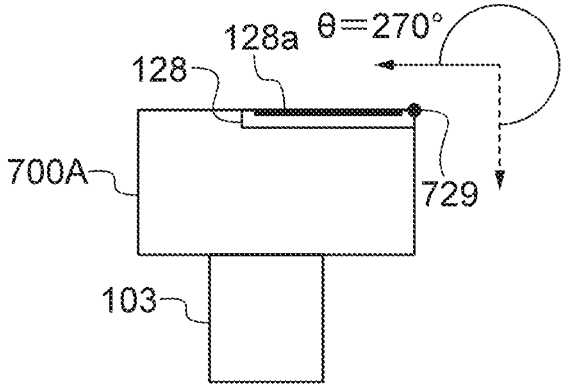

FIG. 8B shows a state where the optical axis of the image capturing lens system 103 is parallel to the gravity direction and is directed in the lower direction and the display surface 128*a* is directed upward because the display device 128 is in the storage position. In this case, the relative angle of the display device 128 is 0°, and the absolute angle is 270°. About the absolute direction, the counterclockwise (CCW) direction is defined as the positive direction as with the first embodiment (FIG. 3A to FIG. 3E).

Figure 8C:
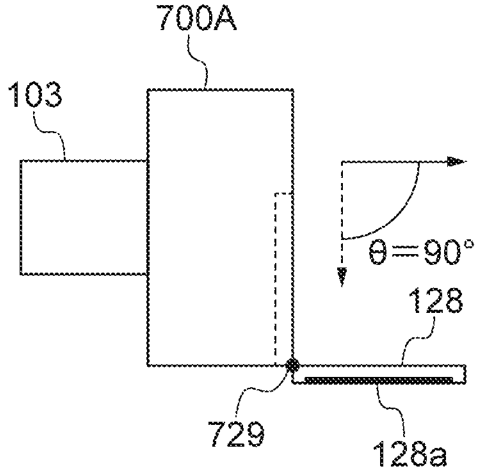

FIG. 8C shows a state where the optical axis of the image capturing lens system 103 is parallel to the horizontal direction and is directed in the left direction and the display surface 128*a* is directed in the lower direction of the apparatus body 700A by rotating the display device 128 downward from the storage position by 90°. In this case, the relative angle of the display device 128 is 90° and the absolute angle is also 90°.

Figure 8D:
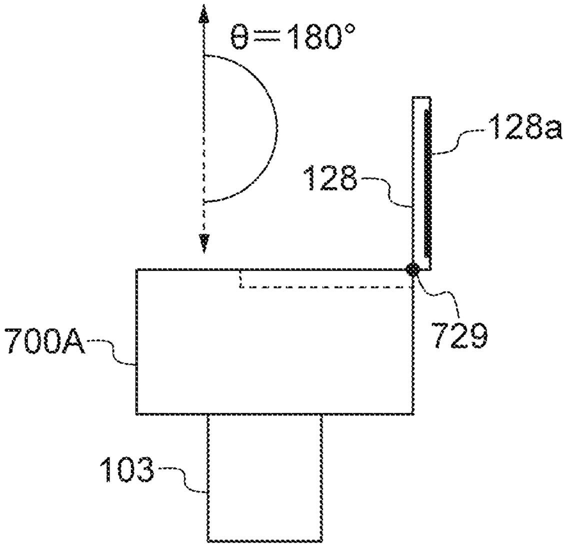

FIG. 8D shows a state where the optical axis of the image capturing lens system 103 is parallel to the gravity direction and is directed in the lower direction and the display surface 128*a* is directed in the right direction by rotating the display device 128 from the storage position in the lower direction of the apparatus body 700A by 90°. In this case, the relative angle of the display device 128 is 90° and the absolute angle is 180°.

Figure 8E:
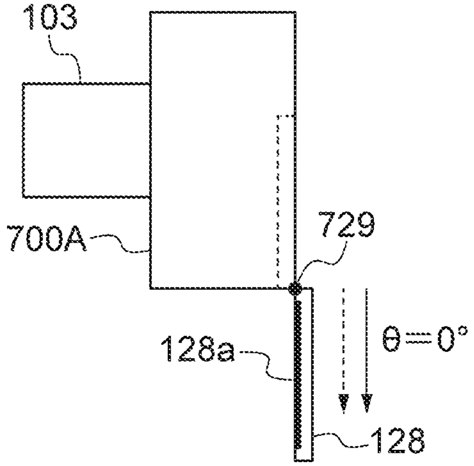

FIG. 8E shows a state where the optical axis of the image capturing lens system 103 is parallel to the horizontal direction and is directed in the left direction and the display surface 128*a* of the display device 128 is directed in the left direction by rotating the display device 128 from the storage position in the lower direction of the apparatus body 700A by 180°. In this case, the relative angle of the display device 128 is 180°, and the absolute angle is 0°. In addition, the display device 128 is below the apparatus body 700A and the display surface 128*a* is directed to the object side.

Although a state where the optical axis of the image capturing lens system 103 is parallel to the gravity direction and is directed upward and the like are not shown, the relative angle of the display device 128 can be detected in the range of 0° or more and 180° or less and the absolute angle can be detected in the range of 0° or more and less than 360° as described above.

Since the flowcharts in FIG. 4A and FIG. 4B described in the first embodiment and the flowcharts in FIG. 6A and FIG. 6B described in the second embodiment can be applied to the display direction setting process to set the display direction of an image on the display device 128 of the digital camera 700, the descriptions thereof will be omitted here.

Figure 9A:
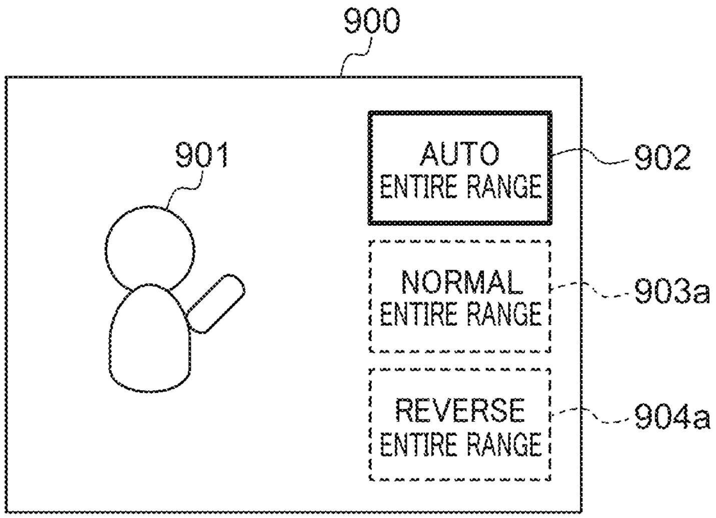
FIG. 9A to FIG. 9C are views showing examples of an entire-range display setting screen displayed on the display device.
Figure 9B:
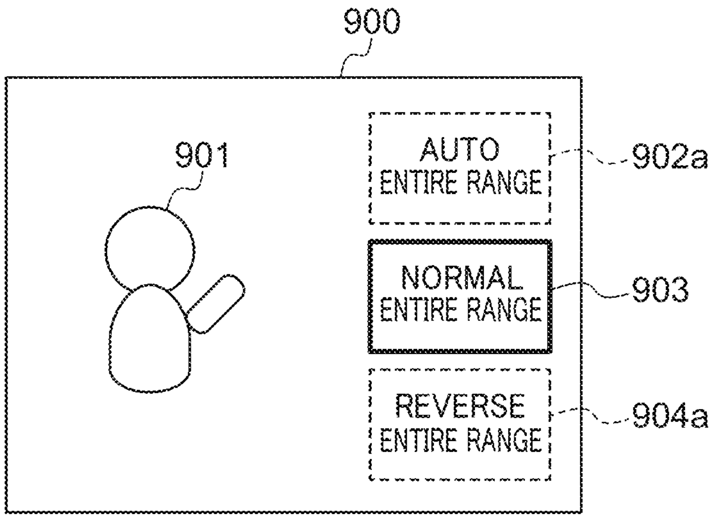
Figure 9C:
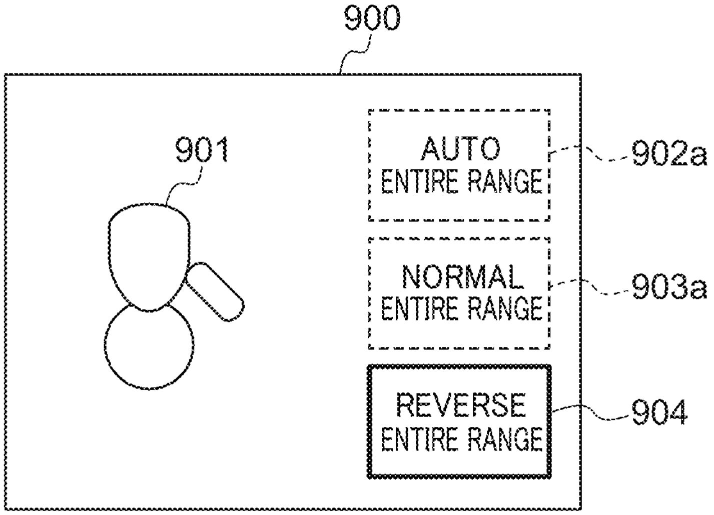

FIG. 9A to FIG. 9C are views showing examples of an entire-range display setting screen 900 displayed on the display device 128. In the above description about S401 and S402, it is described that the entire-range display setting screen can be displayed on the display device 128 by an operation of the menu button or the like included in the other operation members 170. Hereinafter, an entire-range display setting screen that can be displayed on the display device 128 in a situation where an object image is live view displayed on the display device 128 or the object is captured as a moving image will be described.

The entire-range display setting screen 900 can be displayed on the display device 128 in response to, for example, a press operation to a one-touch button (not shown) included in the other operation members 170 or a touch operation to an entire-range display setting call icon (not shown) displayed on the display device 128. Three icons indicating "auto", "normal", and "reverse", which are choices in the entire-range display setting, are displayed in the entire-range display setting screen 900.

FIG. 9A shows a state where an auto icon 902 is selected. For example, a frame of the auto icon 902 is shown in red, and a normal icon 903*a* and a reverse icon 904*a* that are not selected are shown without frames, so that selection and non-selection can be visually distinguished. A display method for distinguishing between selection and non-selection is not particularly limited.

When a user operates to touch the normal icon 903*a* on the screen in FIG. 9A, the screen transitions to a display screen in FIG. 9B. In FIG. 9B, the normal icon 903*a* without a frame in FIG. 9A is changed to a normal icon 903 with a red frame, the auto icon 902 is changed to an auto icon 902*a* without a frame, and the reverse icon 904*a* is not changed.

When the user operates to touch the reverse icon 904*a* on the screen in FIG. 9B, the screen transitions to a display surface in FIG. 9C. In FIG. 9C, the reverse icon 904*a* without a frame in FIG. 9B is changed to a reverse icon 904 with a red frame, the normal icon 903 is changed to the normal icon 903*a* without a frame, and the auto icon 902*a* is not changed. Further, since the reverse icon 904 is activated, a captured image (an object image 901) is vertically reversed. The screens in FIG. 9A to FIG. 9C transition to each other according to the selected icon.

Figure 10A:
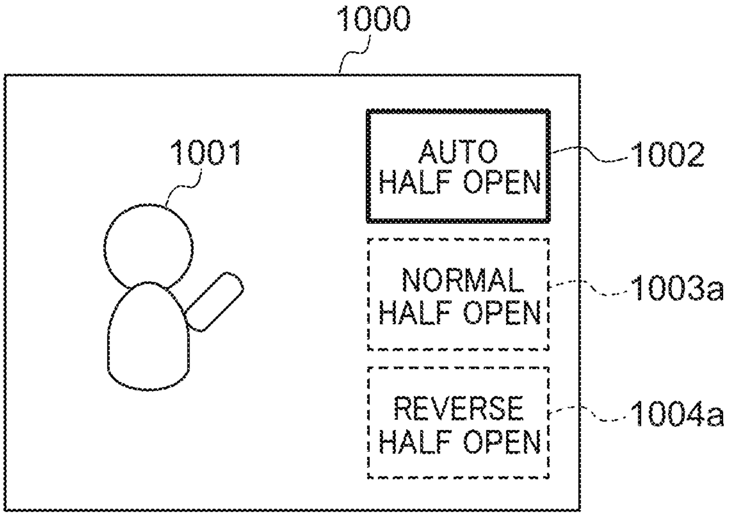
FIG. 10A to FIG. 10C are views showing examples of a half-open setting screen displayed on the display device.
Figure 10B:
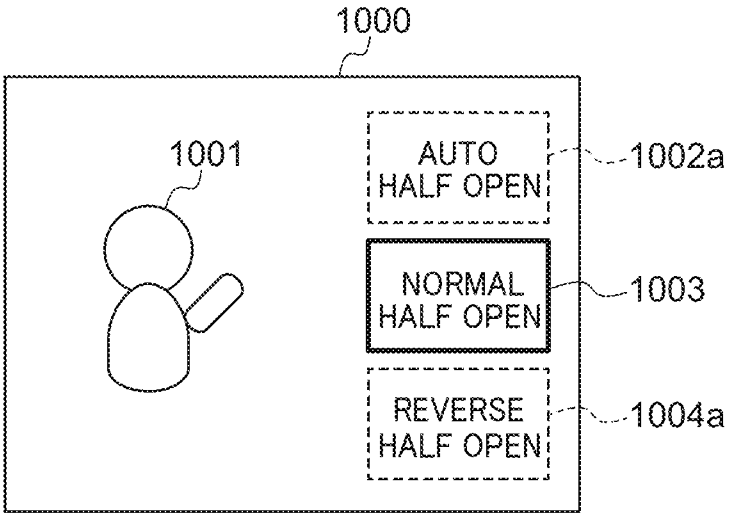
Figure 10C:
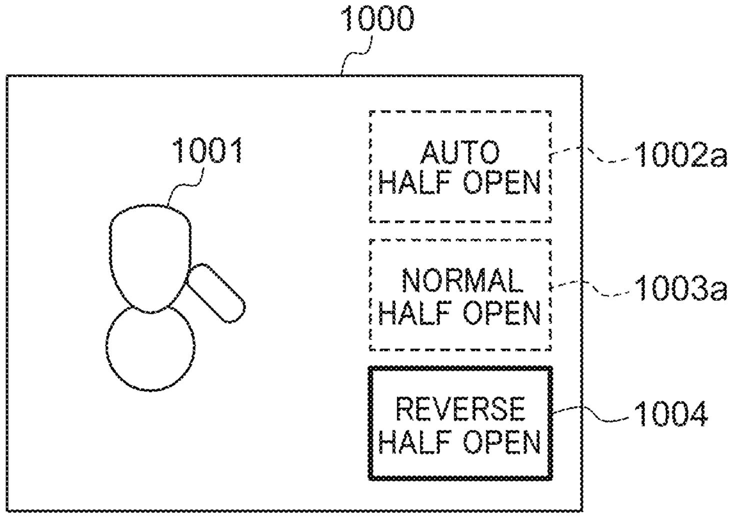

FIG. 10A to FIG. 10C are views showing examples of a half-open display setting screen 1000 displayed on the display device 128. In the above descriptions about S609 and S610, it is described that the half-open display setting screen can be displayed from the entire-range display setting screen displayed on the display device 128. Here, the half-open display setting screen that can be displayed on the display device 128 when "auto" is selected as the entire-range display setting in a state where an object image is displayed as a live view on the display device 128 or a moving image is captured will be described.

The half-open display setting screen 1000 can be displayed on the display device 128 by, for example, a long press operation of a one touch button (not shown) for displaying the entire-range display setting screen 900 or a touch operation to a half-open display setting call icon (not shown) displayed on the display device 128. The half-open display setting call icon (not shown) may be displayed only when the relative angle of the display device 128 is in the range of 90° or more and 135° or less. Three icons indicating "auto", "normal", and "reverse", which are choices in the half-open display setting, are displayed on the half-open display setting screen 1000.

FIG. 10A shows a state where an auto icon 1002 is selected and a frame of the auto icon 1002 is shown in red. On the contrary, a normal icon 1003*a* and a reverse icon 1004*a* that are not selected are shown without frames, so that selection and non-selection can be visually distinguished. A display method for distinguishing between selection and non-selection is not particularly limited.

When the user operates to touch the normal icon 1003*a* on the screen in FIG. 10A, the screen transitions to a display screen in FIG. 10B. In FIG. 10B, the normal icon 1003*a* without a frame in FIG. 10A is changed to a normal icon 1003 with a red frame, the auto icon 1002 is changed to an auto icon 1002*a* without a frame, and the reverse icon 1004*a* is not changed.

When the user operates to touch the reverse icon 1004*a* on the screen in FIG. 10B, the screen transitions to a display screen in FIG. 10C. In FIG. 10C, the reverse icon 1004*a* without a frame in FIG. 10B is changed to a reverse icon 1004 with a red frame. Also, the normal icon 1003 is replaced with a normal icon 1003*a* with no frame and the auto icon 1002*a* is unchanged. Further, since the reverse icon 1004 is activated, the captured image (an object image 1001) is vertically reversed. The screens in FIG. 10A to FIG. 10C transition to each other according to the selected icon.

Although the present invention has been described in detail based on the preferred embodiments thereof, the present invention is not limited to these specific embodiments, and various embodiments within a scope not departing from the gist of the present invention are also included in the present invention. Further, each of the embodiments described above merely shows one embodiment of the present invention, and it is also possible to appropriately combine the embodiments.

For example, although the entire-range display setting is set by displaying the menu screen on the display device 128 by the operation of the menu button and using the cross button or the SET button in the first embodiment, the setting is not limited to the button operation, and may be set by a touch operation to the touch panel 170*a*.

In the above embodiment, the relative angles of the display device 128 are divided into three ranges including the range of 0° or more and less than 90°, the range of 90° or more and 135° or less, and the range of more than 135° and 180° or less, but angular ranges are not limited thereto. Similarly, in the above embodiment, the absolute angles are divided into three ranges including the range of 90° or more and 270° or less, the range of 0 degree or more and less than 90°, and the range of more than 270° and less than 360°, but angular ranges are not limited thereto.

In addition, the half-open display setting is allowed and activated in the case where it is determined that the entire-range display setting is set to "auto" in S608 in the second embodiment. The present invention is not limited to this, and the half-open display setting may be allowed and activated regardless of the entire-range display setting.

Although the digital camera is taken as an example of the image capturing apparatus according to the present invention in the above embodiments, the present invention is not limited thereto. The present invention can be applied to an image capturing apparatus including a display device of which an angle with respect to an apparatus body is changeable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-178720, filed Oct. 17, 2023, which is hereby incorporated by reference herein in its entirety.

What is claimed is:

1. An image capturing apparatus comprising:

an image capturing device;

a display device attached to an apparatus body of the image capturing apparatus so as to be movable between a position where a display surface is directed to an object side where an image capturing object to be captured by the image capturing device exists and a position where the display surface is directed in a direction opposite to the object side;

a first detector that detects a relative angle of the display device with respect to the apparatus body as a relative position;

a second detector that detects an absolute angle of the display device that is formed between a gravity direction and a direction from the rotation shaft toward a rotation end of the display device;

a memory device that stores a set of instructions; and at least one processor that executes the set of instructions to:

set a display setting of a captured image captured by the image capturing device on the display surface to any one of a first setting to display the captured image in a first direction regardless of a relative position between the display device and the apparatus body, a second setting to display the captured image in a second direction opposite to the first direction regardless of the relative position, and a third setting to automatically switch a display direction of the captured image between the first direction and the second direction in accordance with the relative position;

display the captured image on the display surface in the first direction in a case where the third setting is set and the relative angle is in a first angular range;

display the captured image on the display surface in the second direction in a case where the third setting is set and the relative angle is in a second angular range;

display the captured image on the display surface in the second direction in a case where the third setting is set, the relative angle is not in the first angular range and the second angular range, and the absolute angle is in a third angular range; and display the captured image on the display surface in the first direction in a case where the third setting is set, the relative angle is not in the first angular range and the second angular range, and the absolute angle is not in a third angular range.

2. The image capturing apparatus according to claim 1, wherein the display device is rotatably connected to the apparatus body with a rotation shaft provided at an upper end or a lower end of a back face side of the apparatus body, and wherein the display surface is directed to the object side in a case where the display device is above the apparatus body or below the apparatus body.

3. The image capturing apparatus according to claim 1, wherein the relative angle is defined as 0 degrees in a case where the display surface is directed in the direction opposite to the object side and is defined as 180 degrees in a case where the display surface is directed to the object side;

wherein the first angular range is 0 degrees or more and less than 90 degrees, and the second angular range is more than 135 degrees and 180 degrees or less, and wherein the first direction is a direction in which the captured image is displayed as a normal image on the display surface in a state where the display surface is directed in the direction opposite to the object side.

4. The image capturing apparatus according to claim 1, wherein the third angular range is 90 degrees or more and 270 degrees or less.

5. The image capturing apparatus according to claim 1, wherein the at least one processor executes instructions in the memory device to display icons for switching between the first setting, the second setting, and the third setting on the display surface together with the captured image.

6. An image capturing apparatus comprising:

an image capturing device;

a display device attached to an apparatus body of the image capturing apparatus so as to be movable between a position where a display surface is directed to an object side where an image capturing object to be captured by the image capturing device exists and a position where the display surface is directed in a direction opposite to the object side;

a first detector that detects a relative angle of the display device with respect to the apparatus body as a relative position;

a memory device that stores a set of instructions; and at least one processor that executes the set of instructions to:

set a display setting of a captured image captured by the image capturing device on the display surface to any one of a first setting to display the captured image in a first direction regardless of a relative position between the display device and the apparatus body, a second setting to display the captured image in a second direction opposite to the first direction regardless of the relative position, and a third setting to automatically switch a display direction of the captured image between the first direction and the second direction in accordance with the relative position;

display the captured image on the display surface in the first direction in a case where the third setting is set and the relative angle is in a first angular range;

display the captured image on the display surface in the second direction in a case where the third setting is set and the relative angle is in a second angular range; and set a display direction setting of the captured image on the display surface to any one of a fourth setting to fix in the first direction, a fifth setting to fix in the second direction, and a sixth setting to automatically switch between the first direction and the second direction in a case where the third setting is set and the relative angle is not in the first angular range and the second angular range.

7. The image capturing apparatus according to claim 6, wherein the at least one processor executes instructions in the memory device to:

display the captured image on the display surface in the first direction in a case where the fourth setting is set and the relative angle is not in the first angular range and the second angular range; and display the captured image on the display surface in the second direction in a case where the fifth setting is set and the relative angle is not in the first angular range and the second angular range.

8. The image capturing apparatus according to claim 6, wherein the at least one processor executes instructions in the memory device to display the captured image on the display surface in the third setting in a case where the fourth setting or the fifth setting is set and the relative angle is in the first angular range or the second angular range.

9. The image capturing apparatus according to claim 6, wherein the at least one processor executes instructions in the memory device to display the captured image on the display surface in the third setting in a case where the sixth setting is set.

10. The image capturing apparatus according to claim 6, wherein the at least one processor executes instructions in the memory device to display icons for switching between the fourth setting, the fifth setting, and the sixth setting on the display surface together with the captured image.

11. A control method for an image capturing apparatus including a display device attached to an apparatus body of the image capturing apparatus so as to be movable between a position where a display surface is directed to an object side where an image capturing object to be captured by an image capturing device exists and a position where the display surface is directed in a direction opposite to the object side, the control method comprising:

detecting a relative angle of the display device with respect to the apparatus body as a relative position;

detecting an absolute angle of the display device that is formed between a gravity direction and a direction from the rotation shaft toward a rotation end of the display device;

setting a display setting of a captured image captured by the image capturing device on the display surface to any one of a first setting to display the captured image in a first direction regardless of a relative position between the display device and the apparatus body, a second setting to display the captured image in a second direction opposite to the first direction regardless of the relative position, and a third setting to automatically switch a display direction of the captured image between the first direction and the second direction in accordance with the relative position;

displaying the captured image on the display surface in the first direction in a case where the third setting is set and the relative angle is in a first angular range;

displaying the captured image on the display surface in the second direction in a case where the third setting is set and the relative angle is in a second angular range;

displaying the captured image on the display surface in the second direction in a case where the third setting is set, the relative angle is not in the first angular range and the second angular range, and the absolute angle is in a third angular range; and displaying the captured image on the display surface in the first direction in a case where the third setting is set, the relative angle is not in the first angular range and the second angular range, and the absolute angle is not in the third angular range.

12. The control method for the image capturing apparatus according to claim 11, wherein the first angular range is 0 degrees or more and less than 90 degrees, the second angular range is more than 135 degrees and 180 degrees or less, and the third angular range is 90 degrees or more and 270 degrees or less.

13. The control method for the image capturing apparatus according to claim 11, further comprising:

setting a display direction setting of the captured image on the display surface to any one of a fourth setting to fix in the first direction, a fifth setting to fix in the second direction, and a sixth setting to automatically switch between the first direction and the second direction in a case where the third setting is set and the relative angle is not in the first angular range and the second angular range;

displaying the captured image on the display surface in the first direction in a case where the fourth setting is set and the relative angle is not in the first angular range and the second angular range;

displaying the captured image on the display surface in the second direction in a case where the fifth setting is set and the relative angle is not in the first angular range and the second angular range;

displaying the captured image on the display surface with the third setting by disabling the fourth setting or the fifth setting in a case where the fourth setting or the fifth setting is set and the relative angle is in the first angular range or the second angular range; and displaying the captured image on the display surface with the third setting in a case where the sixth setting is set.

14. A control method for an image capturing apparatus comprising an image capturing device and a display device attached to an apparatus body of the image capturing apparatus so as to be movable between a position where a display surface is directed to an object side where an image capturing object to be captured by the image capturing device exists and a position where the display surface is directed in a direction opposite to the object side, the control method comprising:

detecting a relative angle of the display device with respect to the apparatus body as a relative position;

setting a display setting of a captured image captured by the image capturing device on the display surface to any one of a first setting to display the captured image in a first direction regardless of a relative position between the display device and the apparatus body, a second setting to display the captured image in a second direction opposite to the first direction regardless of the relative position, and a third setting to automatically switch a display direction of the captured image between the first direction and the second direction in accordance with the relative position;

displaying the captured image on the display surface in the first direction in a case where the third setting is set and the relative angle is in a first angular range;

displaying the captured image on the display surface in the second direction in a case where the third setting is set and the relative angle is in a second angular range; and setting a display direction setting of the captured image on the display surface to any one of a fourth setting to fix in the first direction, a fifth setting to fix in the second direction, and a sixth setting to automatically switch between the first direction and the second direction in a case where the third setting is set and the relative angle is not in the first angular range and the second angular range.

* * * * *